J. W. GAMBLE.
DRAFT CONNECTION FOR PLOWS.
APPLICATION FILED MAR. 21, 1914.
1,242,793.
Patented Oct. 9, 1917.
2 SHEETS—SHEET 1.
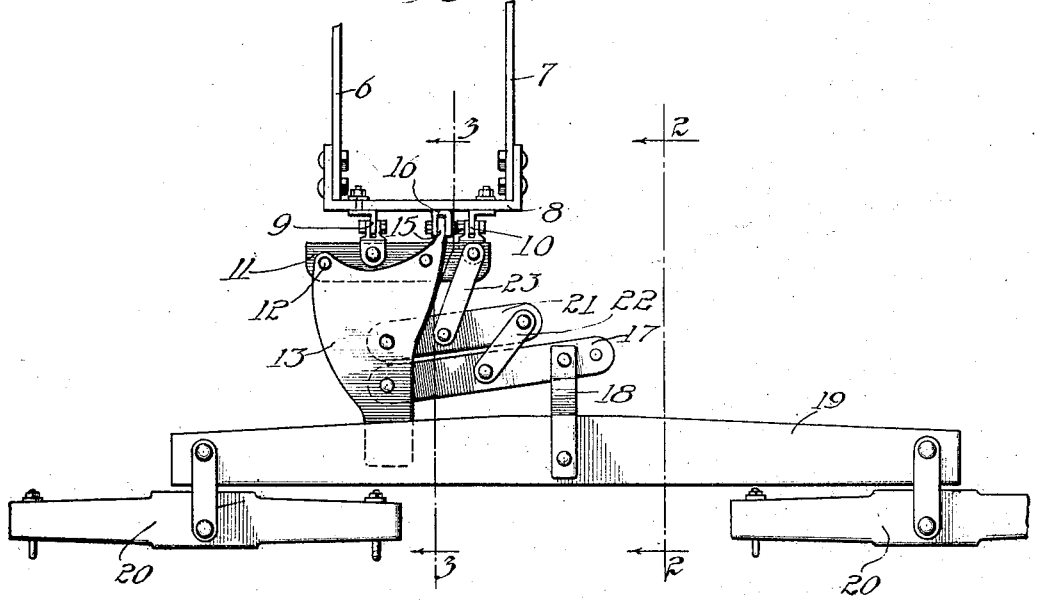
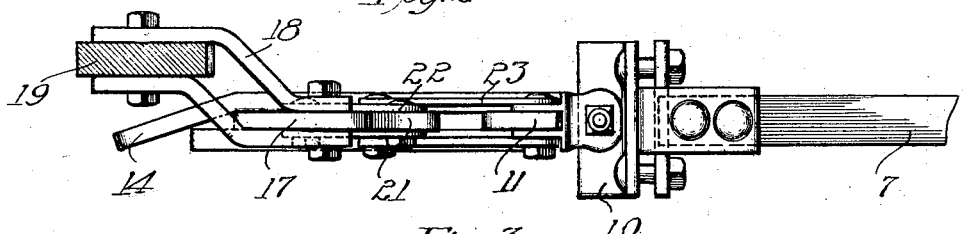
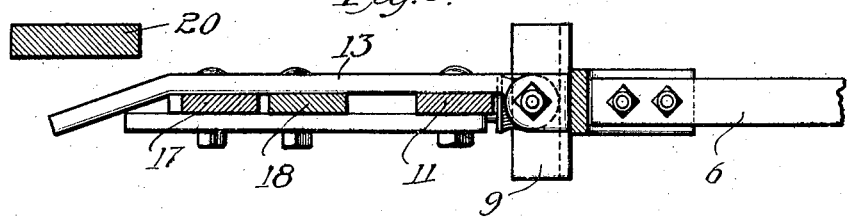
Witnesses:
Inventor:

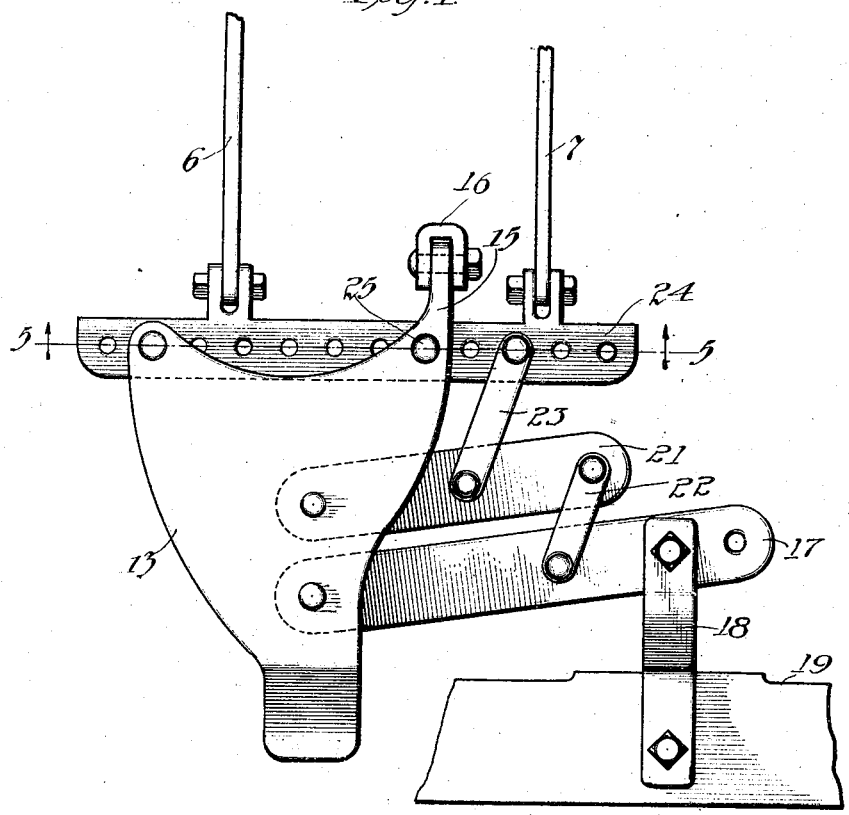
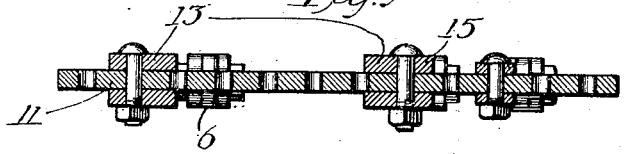

UNITED STATES PATENT OFFICE.

JOSEPH W. GAMBLE, OF OMAHA, NEBRASKA, ASSIGNOR TO ILLINOIS IRON & BOLT COMPANY, OF CARPENTERSVILLE, ILLINOIS.

DRAFT CONNECTION FOR PLOWS.

1,242,793.        Specification of Letters Patent.       Patented Oct. 9, 1917.

Application filed March 21, 1914. Serial No. 826,174.

*To all whom it may concern:*

Be it known that I, JOSEPH W. GAMBLE, a citizen of the United States of America, and resident of Omaha, Nebraska, have invented a certain new and useful Improvement in Draft Connections for Plows, of which the following is a specification.

My invention relates to an improved draft connection for wheeled plows—that is, to improved means for connecting the head of the plow with the usual evener bar to which the horses are attached.

In four horse wheel plows, it is desirable that the furrow horse walk in the last or open furrow and that the remaining horses walk on the unplowed ground. This offset position of the horses thrusts the center point of the evener bar to a point offset toward the land from the center line of the plow. If connection is made with the evener bar at a point offset toward the furrow from the center of the evener bar, so that it is connected directly in line with the center of the plow, the draft is unevenly distributed between the horses. If, however, the connection to the evener is maintained at the center of the evener bar, so as to maintain an equal draft to the horses, then this offset connection produces a side thrust toward the furrow.

The object of my invention is to provide means for connecting the offset center of the evener bar to the head of the plow so that any side thrust is avoided, and yet on account of the connection being made to the center of the evener bar the draft between the horses is maintained equal.

My invention will be more clearly understood by having reference to the accompanying drawings, in which—

Figure 1 is a plan view showing the head of the plow with my improved draft connection attached.

Fig. 2 is a sectional view taken on the line 2—2 in Fig. 1, looking in the direction of the arrows.

Fig. 3 is a sectional view taken on the line 3—3 in Fig. 1, looking in the direction of the arrows.

Fig. 4 is a slightly modified form of my invention.

Fig. 5 is a sectional view taken on the line 5—5 in Fig. 1, looking in the direction of the arrows.

In Fig. 1, I have illustrated a portion of a plow comprising the furrow beam 6 and landside beam 7, connected together by the cross member 8 which forms the head of the plow. Secured to the head of the plow are a pair of clamping members 9 and 10, secured at their opposite ends to a cross clevis 11. Pivotally connected at the point 12 to the furrow end of this clevis and substantially at a line with the furrow beam 6, is a main member 13 which consists of a broad body portion which extends forwardly and is provided with a downwardly extending forward end 14.

This member 13 is provided with a rearward extension 15 which extends rearwardly toward the landside and is provided with a bearing 16 which is adapted to bear against the head of the plow 8 at a point on the landside of the center line of the plow. Pivotally connected to this member 13, near its forward end, is a transverse arm 17, the opposite end of which arm is connected by the clevis 18 to the main evener bar 19, to which the double trees 20 are connected in the usual manner. Located just to the rear of this arm 17, there is a second transverse arm 21, likewise pivotally connected to the member 13. A link 22 is provided, which link is pivoted at its forward end to the transverse arm 17, and then extends rearwardly and toward the landside and is pivotally connected at its rear end to the landside of the arm 21. A second link 23 is provided which is pivoted at its forward end to the arm 21 and at its rear end to the cross clevis 11. This arm likewise extends at an angle to the travel of the plow, as clearly indicated in Fig. 1.

When the draft is applied to the evener bar 19, this produces a forward pull on the clevis 18, which pull is transmitted to the arm 17. This causes the arm 17 to swing in a forward direction about its pivotal point of connection with the main member 13, and this movement of the arm 17 causes the link 22 to straighten toward the land. This movement produces a side pull toward the land on the arm 17, and in this manner the pull is transmitted through the arm 17 to the member 13 to the point of connection 12—that is, the pull comes from a point substantially in line with the furrow beam of the plow. A certain amount of pull is also transmitted from the arm 17 through the link 22, arm 21, link 23, to the head of the plow adjacent to the landside beam. This pull on the landside of the head of the plow, however, is somewhat counteracted by the compression produced by the bearing 16 pressing back against the head of the plow.

It will thus be seen that by this construction, I obtain two draft points, one substantially in line with the furrow beam and the other substantially in line with the landside beam. And furthermore, there is no side thrust whatever toward the furrow on the ends of the beams, all such side thrust being entirely eliminated.

In Figs. 4 and 5, I have shown a slightly modified form of my invention in which the draft connection is adapted to be connected directly to a cross clevis 24, which is directly connected to the plow beams 6 and 7. In this modification the only change necessary is to provide a bolt 25 which extends through the member 13 and through one of the series of holes in the clevis 24, so that the compression produced by the landside end 15 of this member 13 bears back against this clevis through this bolt connection, instead of by means of the compression of the bearing 16 against the head of the plow, as shown in Fig. 1. Otherwise, the operation of this device is substantially the same as that already described.

It will thus be seen that I have devised a draft connection in which all side draft on the plow is eliminated. With my connection there is no side thrust on the end of the beam toward the furrow as all parts of this connection pull toward the land and in turn pull the front end of the plow toward the land. When draft is applied the connecting links 22 and 23 try to straighten, and they in turn exert a side pull toward the land on the bolt 12, which is in turn carried to bolt 9. It will thus be seen that I have devised a very efficient draft connection, and while I have illustrated certain specific embodiments of my invention, it will, of course, be understood that I do not wish to be limited to the exact construction shown and described, but that various modifications and changes will readily suggest themselves to those skilled in the art and still come within the contemplated scope of my invention.

What I claim as my invention is:

1. In a device of the class described, a furrow beam and a landside beam, a cross member connecting said beams, an evener bar offset toward the right hand side of said beams, a draft connection connected at midpoint of said evener bar, said draft connection comprising a main member pivotally connected to said cross member at a point substantially in line with said furrow beam, and transverse arms pivotally connected to said main member, one of said arms being connected to said evener bar, and the other of said arms being connected to the landside of said transverse member and means for producing a side pull toward the land.

2. In a device of the class described, a furrow beam and a landside beam, a cross member connecting said beams, an evener bar offset toward the right hand side of said beams, a clevis connected to the midpoint of said evener, an arm pivotally connected to said clevis and extending toward the furrow side, a main member connected to the furrow end of said arm, the rear end of said member being pivotally connected to the landside end of said cross member, and a second arm extending substantially parallel to said first arm and pivotally connected to said main member, and a rearwardly and landwardly extending link pivotally connected at its opposite ends to said arms and means in said connection for transmitting the pull on said evener to a point at or near the land side beam.

3. In a device of the class described, a furrow beam and a landside beam, a cross member connecting said beams, an evener bar offset toward the right hand side of said beams, a clevis connected to the midpoint of said evener, an arm pivotally connected to said clevis and extending toward the furrow side, a main member connected to the furrow end of said arm, the rear end of said member being pivotally connected to the landside end of said cross member, a second arm extending substantially parallel to said first arm and pivotally connected to said main member, a rearwardly and landwardly extending link pivotally connected at its opposite ends to said arms, and a second link connection from a midpoint of said second arm to the landside end of said cross member.

Signed by me at Harcourt, Iowa, this 17th day of March 1914.

JOSEPH W. GAMBLE.

Witnesses:
B. F. HULL,
O. T. ENGQUIST.